(12) United States Patent
Carro (10) Patent No.: US 8,060,485 B2
(45) Date of Patent: Nov. 15, 2011

(54) METHOD, SYSTEM, AND PROGRAM PRODUCT FOR ACCESSING REQUIRED SOFTWARE TO PROCESS A FILE

(75) Inventor: Fernando Incertis Carro, Paterna (ES)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 12/059,216

(22) Filed: Mar. 31, 2008

(65) Prior Publication Data

US 2008/0235669 A1    Sep. 25, 2008

Related U.S. Application Data

(62) Division of application No. 10/957,256, filed on Oct. 1, 2004, now Pat. No. 7,401,105.

(30) Foreign Application Priority Data

Feb. 10, 2003   (ES) .................................. 2003368091

(51) Int. Cl.
  *G06F 7/00* (2006.01)
  *G06F 17/30* (2006.01)
(52) U.S. Cl. ........................................................ 707/705
(58) Field of Classification Search .................. 707/705, 707/999.205
   See application file for complete search history.

(56) References Cited

U.S. PATENT DOCUMENTS

| | | |
|---|---|---|
| 4,881,075 A | 11/1989 | Weng |
| 5,794,230 A | 8/1998 | Horadan |
| 5,971,277 A | 10/1999 | Cragun |
| 5,978,791 A | 11/1999 | Farber |
| 5,991,760 A | 11/1999 | Gauvin |
| 6,047,312 A * | 4/2000 | Brooks et al. ............... 709/203 |
| 6,167,567 A | 12/2000 | Chiles et al. |

(Continued)

FOREIGN PATENT DOCUMENTS

CA        2327198        5/2002

(Continued)

OTHER PUBLICATIONS

"The Model Primary Content Type for Multipurpose Internet Mail Extensions", S. Nelson et al., Standards Track, RFC 2077, Jan. 1997, 13 pgs., http://www.ietf.org/rfc/rfc2077.txt?number=2077.

(Continued)

*Primary Examiner* — John E Breene
*Assistant Examiner* — Aleksandr Kerzhner
(74) *Attorney, Agent, or Firm* — Anthony England; William Steinberg (57) ABSTRACT

A system, method, and program product for accessing or retrieving on a computer network the required software to process a file is disclosed. It is determined, when accessing a file, whether or not software required to process this file is already installed on the user's computing device, depending upon the type of the file. If the required software is not installed on the user's device, the address of a server from which this software can be downloaded or accessed through the network is extracted and decoded from the filename of the accessed file. A browser or file transfer program is launched on the user's computing device and a request for the required software package is sent from the user's computing device to the server corresponding to the decoded address from which it is downloaded or accessed. The software is then unpacked, if necessary, and installed so as to process the accessed file.

15 Claims, 5 Drawing Sheets

U.S. PATENT DOCUMENTS

| | | | |
|---|---|---|---|
| 6,192,375 | B1 | 2/2001 | Gross |
| 6,199,153 | B1 | 3/2001 | Razdan |
| 6,353,823 | B1 | 3/2002 | Kumar |
| 6,360,252 | B1 | 3/2002 | Rudy et al. |
| 6,367,012 | B1 | 4/2002 | Atkinson |
| 6,381,742 | B2 | 4/2002 | Forbes et al. |
| 6,393,468 | B1 | 5/2002 | McGee |
| 6,453,340 | B1 | 9/2002 | Emura |
| 6,512,840 | B1 | 1/2003 | Tognazzini |
| 7,114,070 | B1 | 9/2006 | Willming et al. |
| 7,330,863 | B2 | 2/2008 | Carro |
| 7,395,426 | B2 | 7/2008 | Lee |
| 7,401,105 | B2 | 7/2008 | Carro |
| 7,617,124 | B1 | 11/2009 | Ronning |
| 7,644,280 | B2 | 1/2010 | Carro |
| 7,752,240 | B2 | 7/2010 | Carro |
| 2001/0020272 | A1 | 9/2001 | Le Pennec |
| 2001/0039587 | A1 | 11/2001 | Uhler et al. |
| 2002/0052885 | A1 | 5/2002 | Levy |
| 2002/0129256 | A1 | 9/2002 | Parmelee |
| 2003/0023973 | A1 | 1/2003 | Monson et al. |
| 2003/0033286 | A1 | 2/2003 | Burgess |
| 2003/0045273 | A1 | 3/2003 | Pyhalammi |
| 2003/0074555 | A1 | 4/2003 | Fahn |
| 2003/0079052 | A1 | 4/2003 | Kushnirskly |
| 2003/0084096 | A1* | 5/2003 | Starbuck et al. ............. 709/203 |
| 2003/0088783 | A1 | 5/2003 | DiPierro |
| 2003/0119386 | A1 | 6/2003 | Laux et al. |
| 2003/0126592 | A1 | 7/2003 | Mishra et al. |
| 2003/0189642 | A1 | 10/2003 | Bean |
| 2003/0200193 | A1 | 10/2003 | Boucher |
| 2003/0204843 | A1* | 10/2003 | Barmettler et al. ........... 717/178 |
| 2003/0208530 | A1 | 11/2003 | Bhogal |
| 2004/0088360 | A1 | 5/2004 | Caughey |
| 2004/0092251 | A1 | 5/2004 | Fell |
| 2005/0004909 | A1 | 1/2005 | Stevenson |
| 2005/0005097 | A1 | 1/2005 | Murakawa |
| 2005/0097114 | A1 | 5/2005 | Carro |
| 2005/0188203 | A1 | 8/2005 | Bhaskaran |
| 2005/0289149 | A1 | 12/2005 | Carro |
| 2006/0059212 | A1 | 3/2006 | Carro |
| 2006/0259516 | A1 | 11/2006 | Stakutis |
| 2007/0168657 | A1 | 7/2007 | Carro |
| 2008/0034280 | A1 | 2/2008 | Carro |
| 2008/0235669 | A1 | 9/2008 | Carro |
| 2009/0043784 | A1 | 2/2009 | Carro |

FOREIGN PATENT DOCUMENTS

| | | |
|---|---|---|
| EP | 0 813 132 | 12/1997 |
| EP | 04 368 024 | 4/2008 |
| EP | 0 236 8131 | 11/2008 |
| JP | PA2001345979 | 12/2001 |
| WO | WO99/05617 | 2/1999 |
| WO | WO2004/049199 | 6/2004 |
| WO | WO2005/098566 | 10/2005 |

OTHER PUBLICATIONS

"MIME (Multipurpose Internet Mail Extensions) Part One: Mechanisms for Specifying and Describing the Format of Internet Message Bodies", N. Borenstein et al., Innosoft, Sep. 1993, 76 pgs., http://web.archive.org/web/2001 072501 091 1/http://archive.ncsa.uiuc.eduISDG/Software/M ....

Various File Formats and How to Deal With Them, 12 pgs., http://www.stack.com/file/extension/, Mar. 1, 2007.

Various File Formats and How to Deal With Them, 12 pgs., http://web.archive.org/web/20030501192745/http://www.mtsu.edu/-webctsup/file-formats/ ..., May 1, 2003.

Download Plug-Ins Using the Packeteer Support Website, 3 pgs., http://support.packeteer.com/documentation/packetguide/current/nav/tasks/configure/down ..., Feb. 26, 2007.

Adobe Reader, 1 pg., http://www.adobe.com/products/acrobatlreadstep2.html, Feb. 23, 2007.

File Types, 1 pg., http://msdn.microsoft.com/library/defaultasp?url=library/en-us/shellcc/platform/shell/pro ..., Feb. 23, 2007.

Computer High-Tech Dictionary File Types, 9 pgs., http://www.computeruser.com/resources/dictionary/filetypes.html, Feb. 23, 2007.

MP3/Tag Studio Homepage, Jan. 24, 2004, http://web.archive.org/20010124052500/http://www.magnusbrading.com/mp3ts/.

MacNames : automation of Macintosh files renaming on a Windows NT/2000/XP server, Dec. 16, 2002, http://web. archive.org/web/20040917081749/peccatte.karefil.com/software/macnames/macnamesen.htm.

IEEE, "IEEE 100: the Authoritative Dictionary of IEEE Standard Terms," IEEE Press, Seventh Edition, 181-182, 210, and 379.

Blanton, "MicroSoft Computer Dictionary," Jan. 22, 2002, MicroSoft Press, Fifth Edition, 122 and 192.

U.S. Appl. No. 10/533,597 Apr. 4, 2007 NonfinalOA (Patent 7,330,863, issued Feb. 12, 2008).

U.S. Appl. No. 10/533,597 May 16, 2007 ReponseToNonfinalOA (Patent 7,330,863, issued Feb. 12, 2008).

U.S. Appl. No. 10/533,597 Sep. 20, 2007 NoticeOfAllowance (Patent 7,330,863, issued Feb. 12, 2008).

U.S. Appl. No. 10/596,244 Oct. 2, 2008 NonFinalRejection (Patent 7,644,280, issued Jan. 5, 2010).

U.S. Appl. No. 10/596,244 Dec. 30, 2008 OAResponse (Patent 7,644,280, issued Jan. 5, 2010).

U.S. Appl. No. 10/596,244 Mar. 11, 2009 FinalOA (Patent 7,644,280, issued Jan. 5, 2010).

U.S. Appl. No. 10/596,244 May 8, 2009 AmendmentAfterFinal (Patent 7,644,280, issued Jan. 5, 2010).

U.S. Appl. No. 10/596,244 May 26, 2009 AdvisoryAction (Patent 7,644,280, issued Jan. 5, 2010).

U.S. Appl. No. 10/596,244 Jun. 11, 2009 RCE (Patent 7,644,280, issued Jan. 5, 2010).

U.S. Appl. No. 10/596,244 Aug. 20, 2009 NoticeOfAllowance (Patent 7,644,280, issued Jan. 5, 2010).

U.S. Appl. No. 10/957,256 Jun. 11, 2007 NonFinalRejection (Patent 7,401,105, issued Jul. 15, 2008).

U.S. Appl. No. 10/957,256 Sep. 11, 2007 ReplyA NonFinalRejection (Patent 7,401,105, issued Jul. 15, 2008).

U.S. Appl. No. 10/957,256 Nov. 28, 2007 FinalRejection (Patent 7,401,105, issued Jul. 15, 2008).

U.S. Appl. No. 10/957,256 Feb. 28, 2008 RCE (Patent 7,401,105, issued Jul. 15, 2008).

U.S. Appl. No. 10/957,256 Mar. 24, 2008 NoticeOfAllowance (Patent 7,401,105, issued Jul. 15, 2008).

U.S. Appl. No. 11/865,147 Nov. 23, 2010 NonfinalOA (U.S. Appl. No. 11/865,147, filed Oct. 1, 2007).

U.S. Appl. No. 11/865,147 Feb. 22, 2011 ResponseToOA (U.S. Appl. No. 11/865,147, filed Oct. 1, 2007).

U.S. Appl. No. 11/865,147 Mar. 31, 2011 NoticeOfAllowance (U.S. Appl. No. 11/865,147, filed Oct. 1, 2007).

U.S. Appl. No. 11/865,147 May 16, 2011 RCE (U.S. Appl. No. 11/865,147, filed Oct. 1, 2007).

U.S. Appl. No. 12/246,260 Nov. 2, 2009 TerminalDisclaimer (Patent 7,752,240, issued Jul. 6, 2010).

U.S. Appl. No. 12/246,260 Nov. 24, 2009 NonfinalOA (Patent 7,752,240, issued Jul. 6, 2010).

U.S. Appl. No. 12/246,260 Feb. 22, 2010 ReplyToOA (Patent 7,752,240, issued Jul. 6, 2010).

U.S. Appl. No. 12/246,260 Mar. 1, 2010 NoticeOfAllowance (Patent 7,752,240, issued Jul. 6, 2010).

Ashman H: "Theory and Practice of Large-Scale Hypermedia Systems", 1997, pp. i-vu and pp. 26-70.

Baker, "The Gecko NRS Web Proxy," Department of Computer Science, University of Arizona, Tucson, AZ, 1999, Elsevier Science BV, pp. 647-658.

Bender, "Techniques for Data Hiding," IBM Systems Journal, vol. 35, Nos. 3&4, 1996, pp. 313-336.

Can I support long file names on my Mac? http://www.zdnet.co.uk/help/tips/story/0,2802,e7107647,00.html.

Feedback on "Tips on Handling Internet Downloads" The Naked PC Online, May 27, 2001, retrieved from the Internet on Jun. 21, 2004, http://web.arehive.orglweb/20010527043912/http://www.thenake.pc.com/dan.

Glassman, Steven, "A caching relay for the World Wide Web"; Computer Networks and ISDN Systems, vol. 27, No. 2 (1994), pp. 165-173.

MP3 Tag Clinic "Rename Page", "Illegal Character Editor", "Main Editor", "Options Panel", "URL Editor", "Metadata Attribute List/Cross Reference", from the Index of HelpFile of version 2.9.

MP3 Tag Clinic, Helpfile of Version 2.0; Feb. 10, 2004; pp. 1-29.

Suel T et al: "Compressing the graph structure of the Web" Data Compression Conference, Proceedings. DCC, IEEE Computer Society Press, Los Alamitos, CA, US, 2001, pp. 213-222.

UIUC DLI Testbed Processing Customization, http://dii.gainger.uitic.edu/papers/coletexl.htm.

Vanzyl, A., Cesnik, B. (1994). "Open Hypertext Systems—An Examination of Requirements, and Analysis of Implementation Strategies, Comparing Microcosm, HyperTED, and the World Wide Web". *Hypermedia Publikationen*. http://www.inf-wiss.uni-konstanz.de/Res/openhypemiedia.html.

X500 Object Identifiers allocated by OpenFortress, Online, Jun. 19, 2002 (2 pgs).

* cited by examiner

To improve the security of data transmitted over computer networks, while preventing digital forgeries and impersonations, document authentication and signer authentication safeguards must be used. The standard solution consists in adding a MAC or Message Authentication Code to the transmitted documents. A MAC is digest computed with a one-way hash Hash Standard", US Dpt of Commerce, May 93, produces a 160-bit hash. It may be combined with a key (e.g., through the use of a mechanism referred to as HMAC or Keyed-Hashing for Message Authentication), subject of the RFC (Request For Comment) of the IETF (Internet Engineering Task Force) under the number 2104.

Authentication.pdf

HMAC is devised so that it can be used with any iterative cryptographic hash function including SHA. Therefore, a MAC can be appended to the transmitted document so that the whole document can be checked by the recipient.

To improve the security of data transmitted over computer networks, while preventing digital forgeries and impersonations, document authentication and signer authentication safeguards must be used. The standard solution consists in adding a MAC or Message Authentication Code to the transmitted documents. A MAC is digest computed with a one-way hash function over the document and which depends on a secret key, known only to the sender and the receiver. The MAC allows the receiver to firstly, check that what is received has well been originated by whom shares the secret-key with him, and secondly, that the document has not been altered.

For example, the Secure Hash Algorithm or SHA specified by the National Institute of Standards and Technologies, NIST, FIPS PUB 180-1, "Secure Hash Standard", US Dpt of Commerce, May 93, produces a 160-bit hash. It may be combined with a key (e.g., through the use of a mechanism referred to as HMAC or Keyed-Hashing for Message Authentication), subject of the RFC (Request For Comment) of the IETF (Internet Engineering Task Force) under the number 2104.

authentication(http..((www.adobe.com(products(acrobat(readstep2.html).pdf

HMAC is devised so that it can be used with any iterative cryptographic hash function including SHA. Therefore, a MAC can be appended to the transmitted document so that the whole document can be checked by the recipient.

METHOD, SYSTEM, AND PROGRAM PRODUCT FOR ACCESSING REQUIRED SOFTWARE TO PROCESS A FILE

CROSS-REFERENCE TO RELATED APPLICATION

This application is a divisional of prior application Ser. No. 10/957,256, which was originally filed on Oct. 1, 2004.

FIELD OF THE INVENTION

The present invention relates generally to network computing and to software accessed on demand in computer networks, and more specifically to a method and system for locating and accessing the software to process a file.

BACKGROUND OF THE INVENTION

The use of global distribution systems such as the Internet for distribution of digital assets like electronic documents, music, film, pictures, games and other content continues to grow. Digital assets are commonly distributed or accessed through networks as computer files.

When such files are accessed or retrieved through a network on a client computer, the client may utilize or process the file with the appropriate software. The types of files are generally recognizable with the extensions at the end of the filenames. This information is used by the operating system to launch the right program when the user clicks on or selects the filename. For example, file.txt represents a text file that can be opened with a text editor program. If a HyperText Markup Language (hereinafter referred to as "HTML") document is accessed, a client's web browser may parse the HTML document so as to display the document. Likewise, if a word processing document is accessed, the client may activate a word processor program to open the document. Alternatively, if an image file is retrieved, an image viewer or an image editor may be activated to process and display the image.

Based on the type of information or resource that is being accessed, a client may need additional functionality. For example, a video and sound clip file may require the capability to view the video and sound clip in a certain format. The added capabilities needed to process accessed files have to be installed on the client computer. Usually, the added capabilities that are installed onto the client computer are referred to as "plug-ins" or helper programs. Thus, when additional capabilities are needed, a plug-in or a helper program is downloaded (i.e. retrieved) and installed on or added to the client computer.

Various data files are typically classified into specific data file types. Upon receiving or accessing a file, the client will typically examine the file extension characterizing the file type, to determine how to process the file, e.g. launch an adapted application program to process the file. As described hereinabove, the file processing may consist of launching an application that has been installed as a plug-in for a browser.

When files are sent as attachments of e-mails through networks, these files must be encoded for transmission. The standard Internet protocol for sending attachments is based upon an encoding scheme called Multipurpose Internet Mail Extensions (hereinafter referred to as "MIME"), designed by the Internet Engineering Task Force. MIME is a specification for formatting non-ASCII messages so that these messages may be sent over networks such as the Internet. MIME enables many browsers to display and output files that are not in an HTML format. In a similar manner, e-mail applications supporting MIME can send and receive files (e.g. image, audio, and video files) via the Internet mail system. MIME types typically identify a content type and allow a browser or server to select the correct type of viewer for a file. There are many predefined MIME types, such as GIF graphics files and PostScript files.

One feature of MIME is that a sending e-mail program inserts a field in outgoing messages identifying what type of files are contained within the encoded attachment. By looking at the information in the MIME header inserted by the sending program, a program which receives the attachments can handle these attachments adequately. For example, if the MIME header identifies an attachment as a spreadsheet (e.g. MIME type=application/ms-excel), then the receiving e-mail program can launch the appropriate spreadsheet program to open the attached file.

Two things need to be done to make sending and receiving MIME attachments work smoothly. First, all users must agree on a common set of names for different attachment types. For example, all e-mail programs should identify Excel (Excel is a Trademark of Microsoft Corp.) spreadsheet attachments with the MIME type of "application/ms-excel", or "text/html" for an attached HTML web page. Secondly, users must initialize their e-mail programs by associating programs with types of attachments. For instance, when using Internet Explorer (Internet Explorer is a Trademark of Microsoft Corp.) as a web browser, the e-mail program must be informed of using Internet Explorer when receiving and processing an attachment of type "text/html".

When a user receives a file through a network and selects the file for processing (e.g. by clicking on the icon of a file attached to a received e-mail), the user needs the corresponding software. As the number of different possible types of digital assets grows, the number of different possible types of files and the corresponding resources that are required for processing these assets also grows. Further, each different type of file may require a different application, helper or plug-in program to access, process, or display each individual file type. Since the resources needed for processing all possible types of files cannot be stored in advance on a client computer, there is a need in the art for a user to be able to obtain access to specific resources from a network (e.g. from the Internet network) for processing specific types of files.

Figure 1:
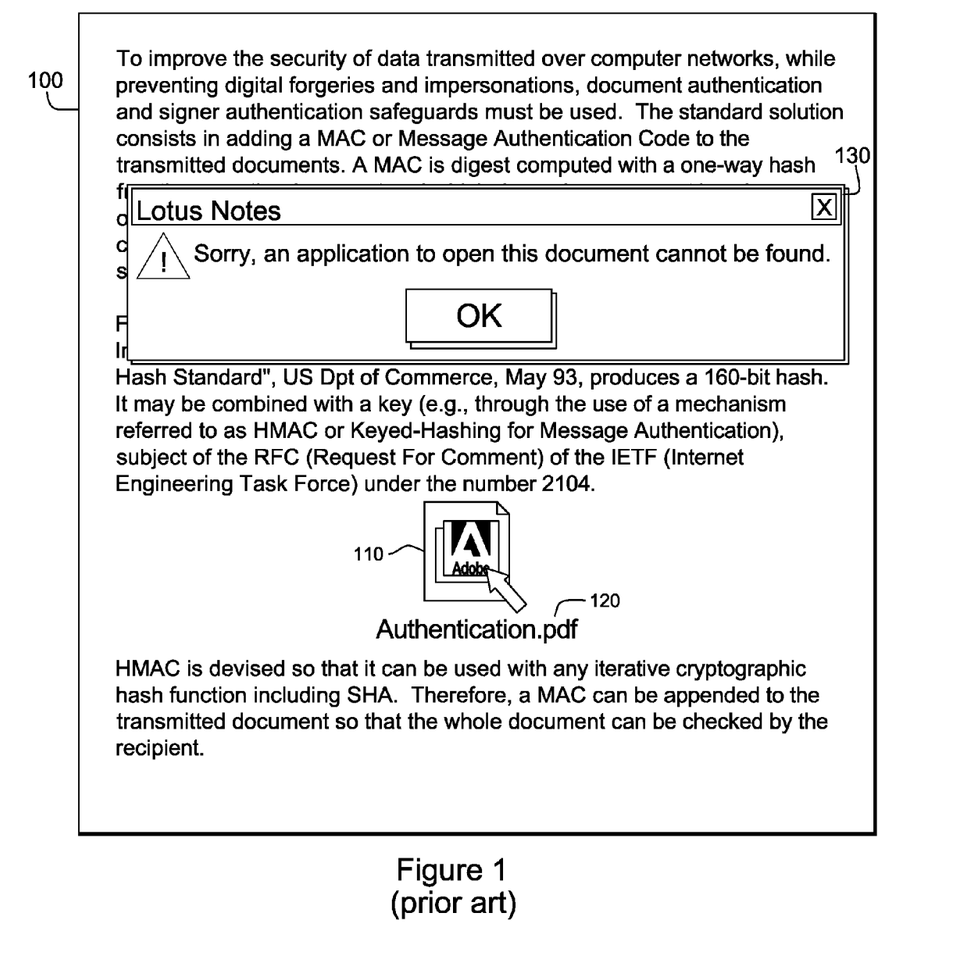
FIG. 1 depicts a standard solution of the prior art for handling files attached to an e-mail.

FIG. 1 illustrates the standard solution of the prior art to deal with such requirements. In the given example, a user receives e-mail 100 including a file attachment, e.g. Adobe Portable Document Format (hereinafter referred to as "PDF") file 110, having name 120 Authentication.pdf (Adobe is a Trademark of Adobe Corp.).

Adobe Acrobat Reader software (Acrobat is a Trademark of Adobe Corp.) or other software products able to process PDF files must be installed on a user's computer system (also referred to hereinbelow as "user's device") for processing the attached file. When the user tries one of the options "View . . . " or "Launch . . . ", the user's device attempts to locate the software adapted to process MIME file type "PDF". If no such software is found, the user receives error message 130, for example, "Sorry, an application to open this document cannot be found" as illustrated.

Therefore, when the software required for processing a file is not installed on the user's device, the user faces several problems that are not trivial for most people (e.g. those who are not expert in information technology and computing systems), as follows:
identify which software is required;
identify and locate on the network a provider of this software;

identify the address, e.g. a Uniform Resource Locator (hereinafter referred to as "URL"), of the provider's software repository for downloading the software and, download and install the required software on the user's device.

Therefore, there is a need in the art for a system and a method for providing easily, on-demand, and transparently, the required software to process an accessed or received file.

SUMMARY OF THE INVENTION

In a method for processing a file, the file has a filename in which an address is encoded for software required to process the file. In other forms, systems and program products are provided.

An aspect includes a computer system receiving a single filename of the file to be processed. The encoded address is encoded in a particular format that includes characters permitted for specifying a uniform resource locator. A second format excludes at least some characters permitted in the first format. The encoded address is encoded is in the second format. The computer system extracts the encoded address from the single filename. The single filename further includes a primary filename of the software, which is required to process said file separated by at least one control character from the encoded address. The computer system decodes the encoded address by converting the encoded address extracted from the single filename into a decoded address formatted in the first format. The decoding also includes the computer system accessing said software required to process said file using the decoded address and processing said file using the accessed software.

BEST MODE FOR CARRYING OUT THE INVENTION

According to the present invention, the filename of a file that is accessed locally or through a computer network is used to encode the address, or URL, of an application, or plug-in, that is adapted to process this file, using a particular lexicography. The lexicography that is used is determined so as to avoid particular characters that may be forbidden by a given file system, e.g. "\" with Microsoft Windows operating system (Windows is a Trademark of Microsoft Corp.), and/or to encode the addresses so as to reduce address sizes. Addresses to be encoded may be of any forms (e.g. local addresses, addresses in private networks, or Internet addresses), however, for sake of illustration, the examples given in the following description are based on URL type of addresses. The address of the required software or plug-in may be encoded either when the file is transmitted from a server to a user system, or when the file is locally saved or transmitted to another system.

Figure 2A:
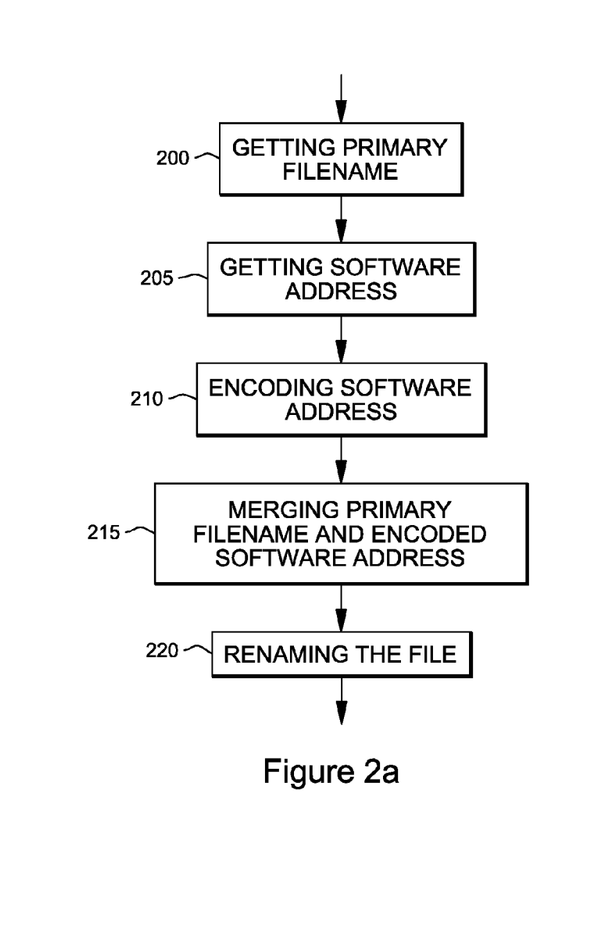
FIGS. 2a, 2b, and 2c depict an example of an algorithm used for encoding, in a filename of a file, the address or URL of software that is required to process this file in accordance with one embodiment of the present invention.
Figure 2B:
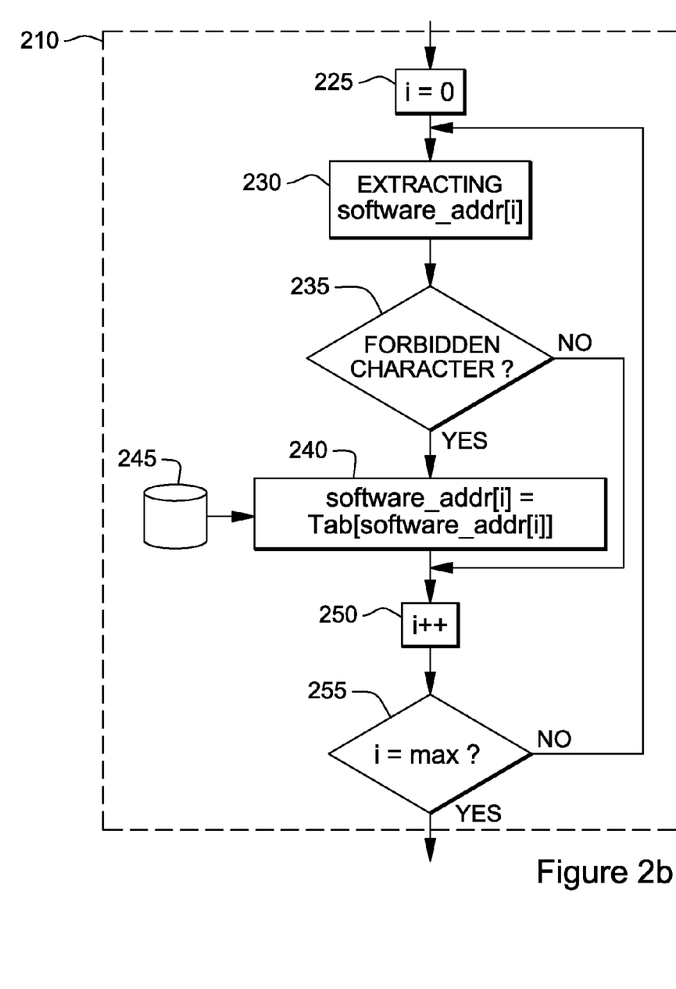
Figure 2C:
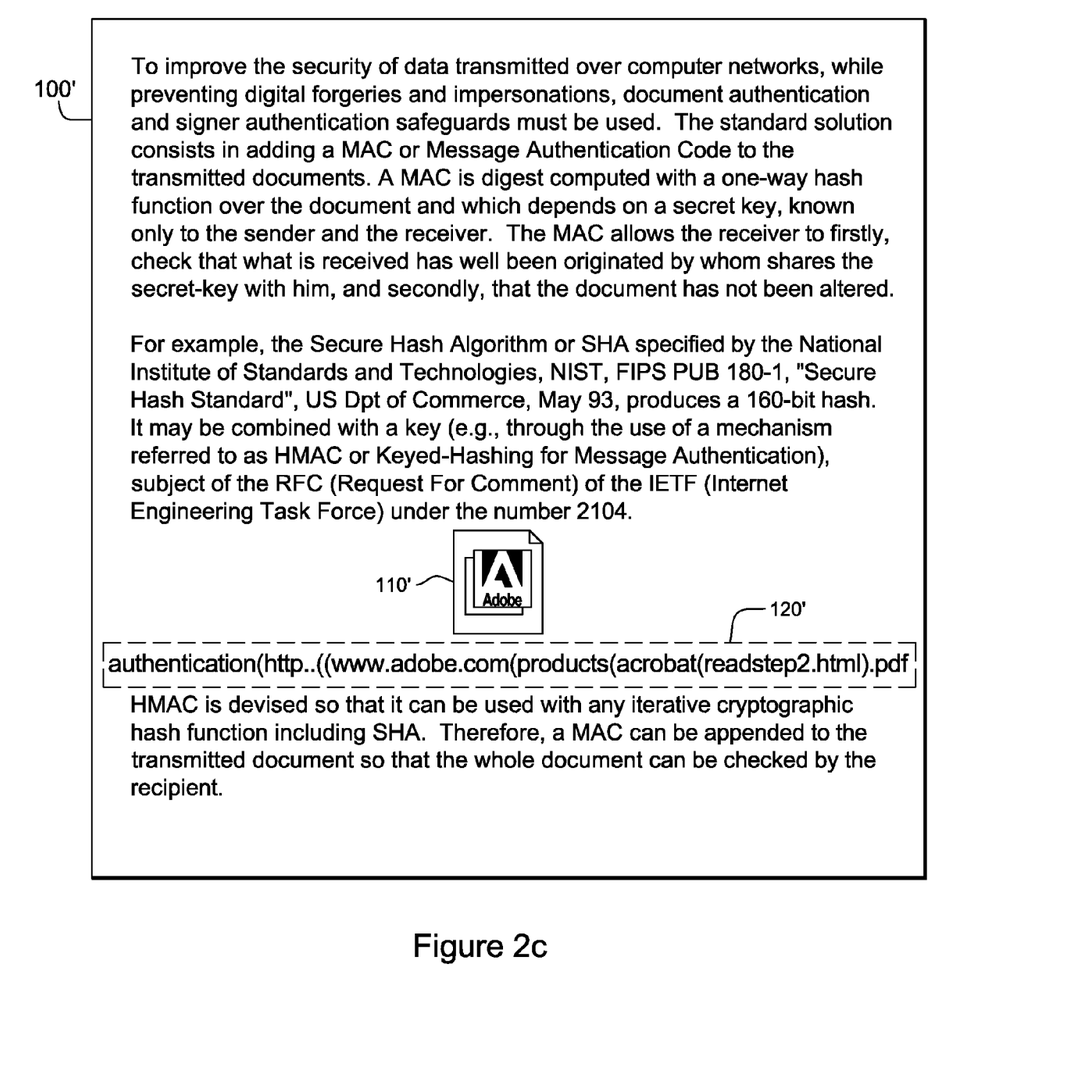

FIGS. 2a, 2b, and 2c depict an example of an algorithm used to encode the required software address. As shown in FIG. 2a, step 200 comprises getting the primary filename of the file (i.e. the filename of the file before encoding the software address), and step 205 comprises getting the address or URL of the software (hereinafter referred to as "software address") that is required to process this file. The software address is encoded in step 210, and merged in step 215 with the primary filename of the file, using particular separators (also referred to hereinbelow as a "control character"), in one example a parenthesis, before the file is renamed with a new filename comprising the primary filename and the encoded software address in step 220.

FIG. 2b depicts an example of encoding algorithm 210. A variable i is set to zero in step 225 and the $i^{th}$ character is extracted from the software address string in step 230. A test is performed in step 235 to determine whether the extracted character is valid or otherwise forbidden by filename syntax rules imposed by the file system of the user's device. If the extracted character is a valid filename character, variable i is incremented in step 250 and a test is performed in step 255 to determine if variable i has reached its maximum value, that is, if all characters of the software address string have been processed. If variable i has not reached its maximum value, the last four steps of the algorithm are repeated (i.e. steps 230 to 255). Otherwise, if variable i has reached its maximum value, the process is stopped. If the character extracted from the software address string is forbidden by the filename syntax rules, a corresponding valid character, or group of characters, is selected from lexicography table 245 and this selected character, or group of characters, replaces the forbidden character in step 240. Variable i is then incremented in step 250 and the test described hereinabove is performed in step 255 to determine if variable i has reached its maximum value.

As an illustration of the algorithm described hereinabove, consider the case of a file based on Adobe PDF named "authentication.pdf", that a user would like to send to someone else as an e-mail attachment using a lexicography table having predetermined characters and associated characters, to encode the software address string into the filename, wherein:

character ":" is associated to ". ."
character "/" is associated to "("

To view this document file, an application named Adobe Acrobat Reader must be used. If this application is not installed, it could be freely downloaded from the following URL:

http://www.adobe.com/products/acrobat/readstep2.html

When the originator of the Adobe PDF document "authentication.pdf" attaches the document to an e-mail, an option such as "Embedding software ADDR . . . " may be selected to encode the URL of the software repository, wherein the software required to process the PDF document can be accessed at:

http://www.adobe.com/products/acrobat/readstep2.html and the filename is modified according to the algorithm depicted in FIGS. 2a and 2b. By using the lexicography table described hereinabove, the software repository URL is encoded as follows:

http.((www.adobe.com(products(acrobat(readstep2.html

The encoded URL is then merged with the filename. In this example, the encoded URL is enclosed in parenthesis that are used as separators. The encoded URL is inserted in front of the extension dot of the primary filename, as follows:

authentication(http.((www.adobe.com(products(acrobat (readstep2.html).pdf

The file is then renamed using this modified filename.

It should be noted that, for sake of illustration, this encoding algorithm is purposely very simple. A preferred algorithm would comprise replacing a sequence of forbidden characters by single characters (e.g. replacing "//:" by ("). In a similar manner, some sets of characters may be replaced by more compact codes (e.g. replacing "http://" by "H!"). Using such compression as described hereinabove serves to optimize encoding, and reduce the size of an encoded software address.

FIG. 2c depicts e-mail 100' wherein filename 120' of attached file 110' has been modified to embed the URL of the required software address.

When the attachment of the above mentioned e-mail is selected to be processed, a test is performed to determine whether or not the software application, or plug-in, required to process this file is locally installed. To process (e.g. read) this file 110', Adobe Acrobat Reader software must be installed on the user's device. If the software is not currently installed, the software would need to be downloaded from a server (i.e. a software repository on the Internet).

Using the same table of lexicographic transformations that has been used by the sender of the file, the software address or URL is extracted and decoded from the filename. To that end, certain symbols or groups of symbols of the "encoded URL" are replaced by symbols or characters that are compatible with URL conventions on the Internet, as mentioned hereinabove, to get the decoded and valid URL, as follows:

http://www.adobe.com/products/acrobat/readstep2.html

Figure 3:
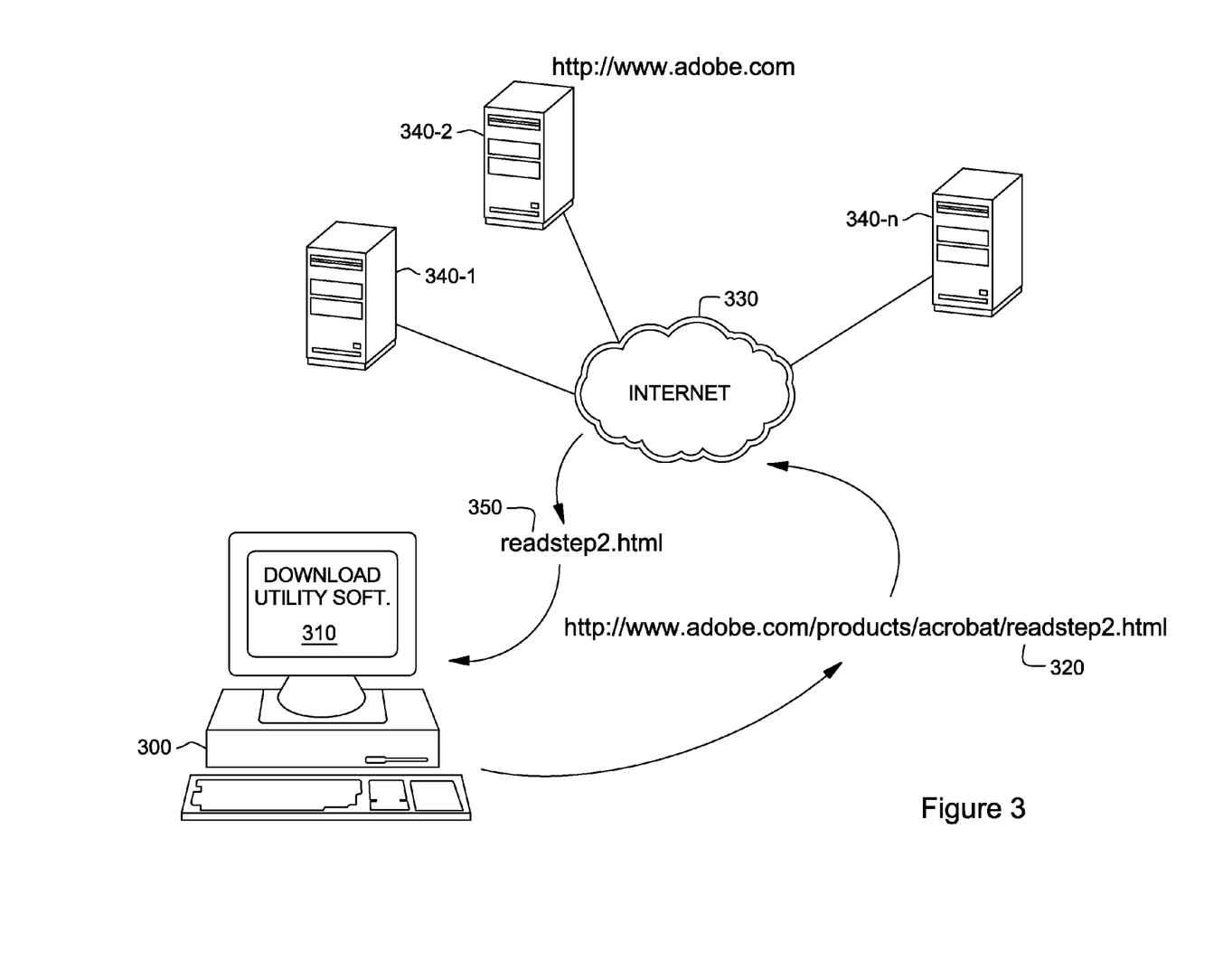
FIG. 3 depicts a network environment wherein the present invention may be implemented.

As depicted in FIG. 3, Web browser program 310 is activated on user's device 300 and extracted URL 320 is copied in the Web browser address field. This decoded URL, extracted from the filename of the attached or accessed file, transmits a request through Internet network 330 to at least one of a plurality of software application repository servers, generally referred to as server 340-1 through server 340-n in FIG. 3. In the given example, the software application repository server 340-2 is www.adobe.com and accessed file 350 is the HTML download utility software page readstep2.html.

The requested download utility software is received and displayed on the user's device. In one example, download utility software asks the user to specify a set of parameters or options, such as language, platform or operating system, and connection speed. Those selections are used to determine which version of the software needs to be downloaded.

Using the parameters specified by the user with the download utility software, the requested software is then downloaded from software application repository 340-2 to the user's device 300 where the software is installed (once decompressed, if required) and launched to process the attached or accessed file. When the file has been processed, the downloaded software may be deleted or stored, depending upon operating system parameters or user needs.

While the present invention allows for encoding of the address of the software required to process a file, additional information relative to the software may also be encoded, such as the particular version of software needed for processing the file.

Figure 4:
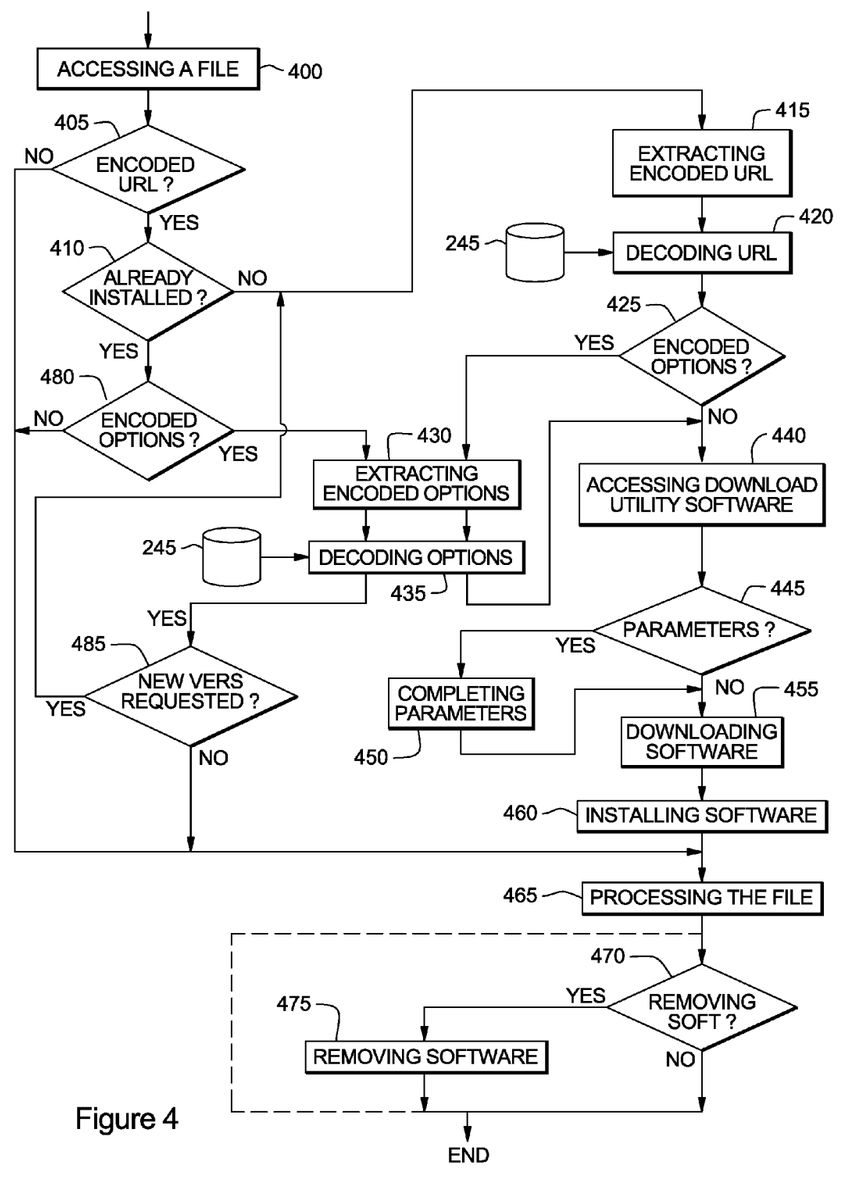
FIG. 4 depicts an example of an algorithm to locate, download, and install a required application in accordance with one embodiment of the present invention.

FIG. 4 depicts in further detail, the algorithm described hereinabove for processing an attached, accessed, or received file having a filename that has been encoded according to the present invention. After having accessed the file to be processed in step 400, in one example by double-clicking on an icon for the file, a test is performed in step 405 to determine whether or not a software address is encoded within the filename. If an encoded software address is embedded within the filename, another test is done in step 410 to determine whether or not the software is already installed on the client's device. If the software is not installed, the encoded software address is extracted from the filename in step 415 and decoded in step 420 using the lexicography table that was used during encoding step 245. A test is then performed in step 425 to determine if the filename comprises encoded options or not. If the filename comprises encoded options, the options are extracted in step 430 and decoded in step 435 using lexicography table 245 that was used during the encoding step. Naturally, the lexicography tables that are used to encode/decode software addresses and options can be different.

When the software address and the options are available, the system accesses the referenced download utility software in step 440. The user may be asked to select other options or enter some parameters in steps 445 and 450, such as language, as mentioned hereinabove. The required software is then downloaded in step 455, installed in step 460, and the file is processed in step 465. The process performed on the file varies according to the type of file and the software access conditions (for example, the connection speed, the kind of software license, and the like). Such a process may comprise, for example, displaying or editing the content of the file.

When the file is closed, depending upon operating system parameters or user needs, as mentioned hereinabove, the software that has been installed can be removed automatically or upon user's request in steps 470 and 475, or can even be permanently stored on local disk if free distribution of the installed software is permitted.

If the required software is already installed on the client's device, a test is done in step 480 to determine whether or not options are encoded within the filename. If options are encoded within the filename, the options are extracted and decoded in steps 430 and 435 as mentioned hereinabove, and a new test is performed to check if, for example, there are options about the minimum version number required for processing the received file. If this is the case, the indicated minimum required version number is compared with the version number of the already installed software in step 485. If, as a result of this test, a new version must be installed, the required software is accessed and installed in the manner described in steps 415 to 465 hereinabove. In such a case, the requested software is preferably stored on permanent storage on the user's device, not being removed once the attached, accessed, or received file has been processed, as suggested with dotted lines. Naturally, depending upon operating system parameters or user needs, the old version of the software may be removed.

In cases where a software address is not embedded within the filename in step 405, or when the required software is already installed on the user's device in step 410, or there are not options encoded as parameters within the filename in step 480, the received file would be immediately processed using already installed software in step 465.

In the illustrative example described hereinabove, the software required to process the attached, accessed, or received file is downloaded before being installed on the user's device with the aim of processing the file. However, it must be understood that the software could be partially executed from a remote server, without being locally installed on the user's device. This may be the case with a transcoding application (e.g. when the format of a received document file must be converted to a format compatible with the user's device) so as to enable the user to view the received document in the small display of a handheld computing device. In this case, the file to be processed (e.g. transcoded) may be parsed or adapted on the server wherein the software is located, and locally displayed on the user's device with a standard file viewer.

Therefore, using the present invention, the user automatically downloads the software package needed for processing an attached, accessed, or received file, which presents several advantages, to wit:

the software required for processing the file is automatically identified the provider, and the address or URL of the required software is automatically determined the version of the installed software may be checked to forewarn users on new existing versions the software required for processing the file could be automatically installed on the client's device Naturally, in order to satisfy local and specific requirements, a person skilled in the art may apply to the solution described hereinabove, modifications and alterations all of which, however, are included within the scope of protection of the invention as defined by the following claims.

What is claimed is:

1. A method for processing a file having a filename in which an address is encoded for software required to process said file, said method comprising:

receiving, by a computer system, a single filename of the file to be processed, the single filename including the encoded address for software required to process said file, the encoded address being encoded in a particular format, wherein a first format includes characters permitted for specifying a uniform resource locator and a second format excludes at least some characters permitted in the first format, and wherein the particular format in which the encoded address is encoded is the second format;

extracting the encoded address from the single filename by the computer system, wherein the single filename further includes a primary filename of the software required to process said file separated by at least one control character from the encoded address;

decoding the encoded address by the computer system, wherein the decoding includes:

converting the encoded address extracted from the single filename into a decoded address formatted in the first format;

the computer system accessing said software required to process said file using the decoded address; and processing said file by the computer system using the accessed software.

2. The method of claim 1, further comprising extracting and decoding encoded options relative to said software.

3. The method of claim 1, wherein said accessing said software required to process said file comprises:

downloading said software required to process said file using the decoded address; and installing said software required to process said file.

4. The method of claim 1, further comprising determining if said software required to process said file is already locally installed.

5. The method of claim 1, wherein the decoding comprises:

the computer system detecting predetermined characters in said encoded address from which said software required to process said file can be accessed; and the computer system replacing said predetermined characters with associated characters stored in a lexicography table.

6. A system for processing a file having a filename in which an address is encoded for software required to process said file, said system comprising:

a computer system for executing program code stored on a recordable medium, the program code including;

program code for receiving a single filename of the file to be processed, the single filename including the encoded address for software required to process said file, the encoded address being encoded in a particular format, wherein a first format includes characters permitted for specifying a uniform resource locator and a second format excludes at least some characters permitted in the first format, and wherein the particular format in which the encoded address is encoded is the second format;

program code for extracting the encoded address from the single filename, wherein the single filename further includes a primary filename of the software required to process said file separated by at least one control character from the encoded address;

program code for decoding the encoded address, wherein the decoding includes;

converting the encoded address extracted from the single filename into a decoded address formatted in the first format;

program code for accessing said software required to process said file using the decoded address; and program code for processing said file using the accessed software.

7. The computer system of claim 6, further comprising program code for extracting and decoding encoded options relative to said software.

8. The system of claim 6, wherein said program code for accessing said software required to process said file comprises:

program code for downloading said software required to process said file using the decoded address; and program code for installing said software required to process said file.

9. The system of claim 6, further comprising program code for determining if said software required to process said file is already locally installed.

10. The computer system of claim 6, wherein said program code for accessing said software required to process said file comprises:

program code for detecting predetermined characters in said encoded address from which said software required to process said file can be accessed; and program code for replacing said predetermined characters with associated characters stored in a lexicography table.

11. A program product stored on a recordable medium for processing a file having a filename in which an address is encoded for software required to process said file, which when executed, comprises:

program code for receiving a single filename of the file to be processed, the single filename including the encoded address for software required to process said file, the encoded address being encoded in a particular format, wherein a first format includes characters permitted for specifying a uniform resource locator and a second format excludes at least some characters permitted in the first format, and wherein the particular format in which the encoded address is encoded is the second format;

program code for extracting the encoded address from the single filename, wherein the single filename further includes a primary filename of the software required to process said file separated by at least one control character from the encoded address;

program code for decoding the encoded address, wherein the decoding includes;

converting the encoded address extracted from the single filename into a decoded address formatted in the first format;

program code for accessing said software required to process said file using the decoded address; and program code for processing said file using the accessed software.

12. The program product of claim 11, further comprising program code for extracting and decoding encoded options relative to said software.

13. The program product of claim 11, wherein said program code for accessing said software required to process said file comprises:

program code for downloading said software required to process said file using the decoded address; and program code for installing said software required to process said file.

14. The program product of claim 11, further comprising program code for determining if said software required to process said file is already locally installed.

15. The program product of claim 11, wherein said program code for accessing said software required to process said file comprises:

program code for detecting predetermined characters in said encoded address from which said software required to process said file can be accessed; and program code for replacing said predetermined characters with associated characters stored in a lexicography table.

* * * * *